United States Patent
Kuroiwa et al.

(10) Patent No.: US 8,246,064 B2
(45) Date of Patent: Aug. 21, 2012

(54) BICYCLE CRANK ASSEMBLY

(75) Inventors: Eigo Kuroiwa, Osaka (JP); Masahiro Yamanaka, Osaka (JP); Shingo Shiraishi, Yamaguchi (JP)

(73) Assignee: Shimano Inc., Osaka (JP)

( * ) Notice: Subject to any disclaimer, the term of this patent is extended or adjusted under 35 U.S.C. 154(b) by 402 days.

(21) Appl. No.: 12/637,796

(22) Filed: Dec. 15, 2009

(65) Prior Publication Data
US 2011/0140390 A1    Jun. 16, 2011

(51) Int. Cl.
*B62M 1/02* (2006.01)
*B62M 3/00* (2006.01)
(52) U.S. Cl. ............... 280/261; 74/594.1; 74/594.2
(58) Field of Classification Search ............. 280/259, 280/260, 261; 74/594.1, 594.2, 594.3, 600; 384/545, 458
See application file for complete search history.

(56) References Cited

U.S. PATENT DOCUMENTS

| | | | |
|---|---|---|---|
| 7,527,277 B2 * | 5/2009 | Nonoshita et al. | 280/259 |
| 7,562,604 B2 * | 7/2009 | Fukui | 74/594.1 |
| 7,650,817 B2 * | 1/2010 | Shiraishi et al. | 74/594.1 |
| 2003/0097901 A1 * | 5/2003 | Yamanaka | 74/594.1 |
| 2005/0081678 A1 * | 4/2005 | Smith et al. | 74/594.1 |
| 2006/0101941 A1 | 5/2006 | Yamanaka | |
| 2006/0112780 A1 | 6/2006 | Shiraishi et al. | |
| 2007/0062328 A1 | 3/2007 | Shiraishi et al. | |
| 2007/0295154 A1 * | 12/2007 | D'Aluisio et al. | 74/594.1 |

* cited by examiner

*Primary Examiner* — Anne Marie M Boehler
(74) *Attorney, Agent, or Firm* — Global IP Counselors, LLP

(57) ABSTRACT

A bicycle crank assembly is provided with a crank arm and an axial gap adjustment device. The crank arm has a crank axle mounting part, an extension part extending from the crank axle mounting part, a pedal attachment part provided on a radial outer end of the extension part and a sprocket attachment part. The axial gap adjustment device includes an adjustment adapter and an adjustment member. The adjustment adapter has a crank arm engagement structure that non-rotatably engages the crank arm, a first crank axle opening, and a first screw part. The adjustment member has a second crank axle opening, and a second screw part threadedly engaged with the first screw part to selectively position the adjustment member relative to the adjustment adapter.

16 Claims, 15 Drawing Sheets

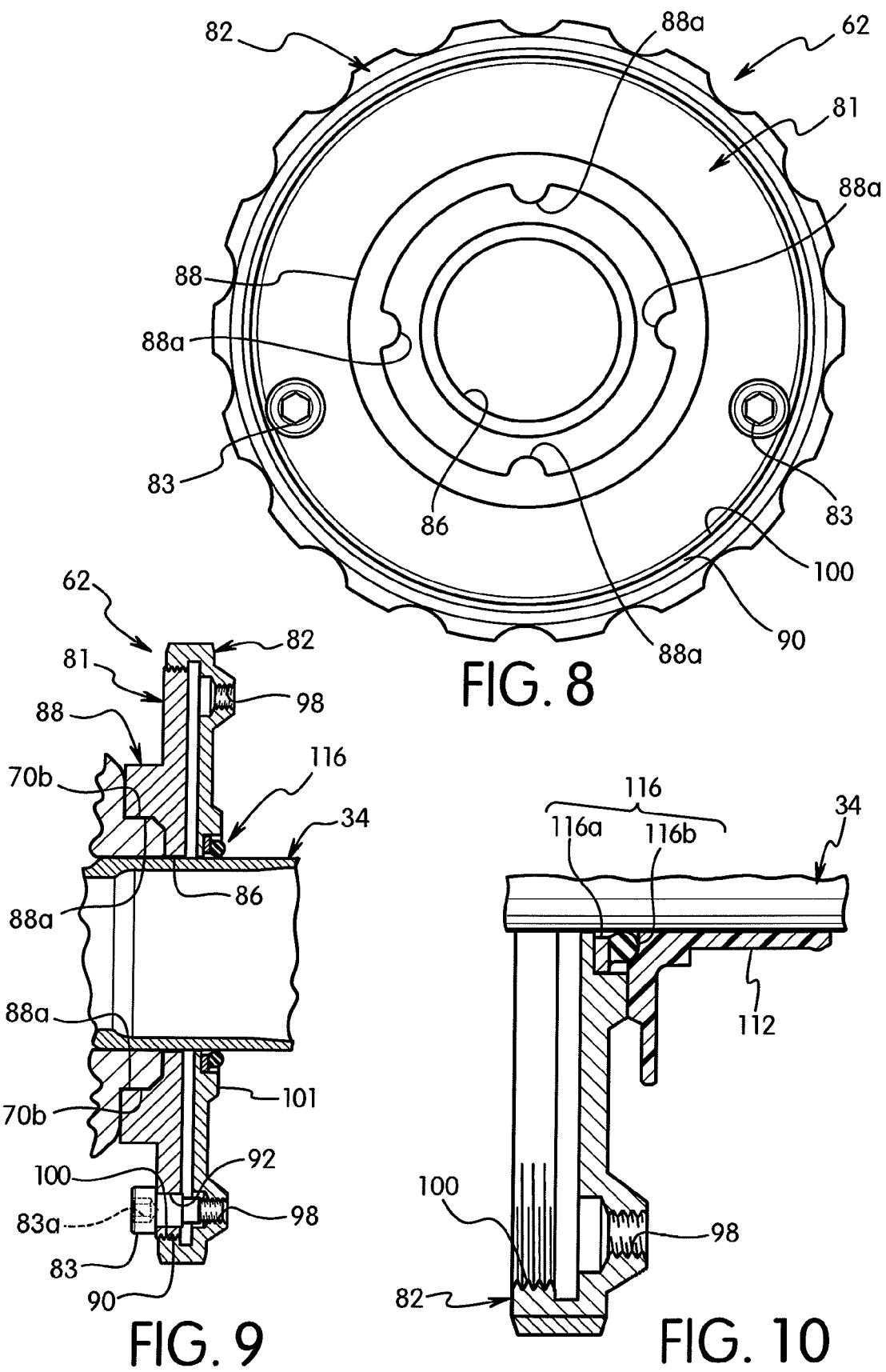

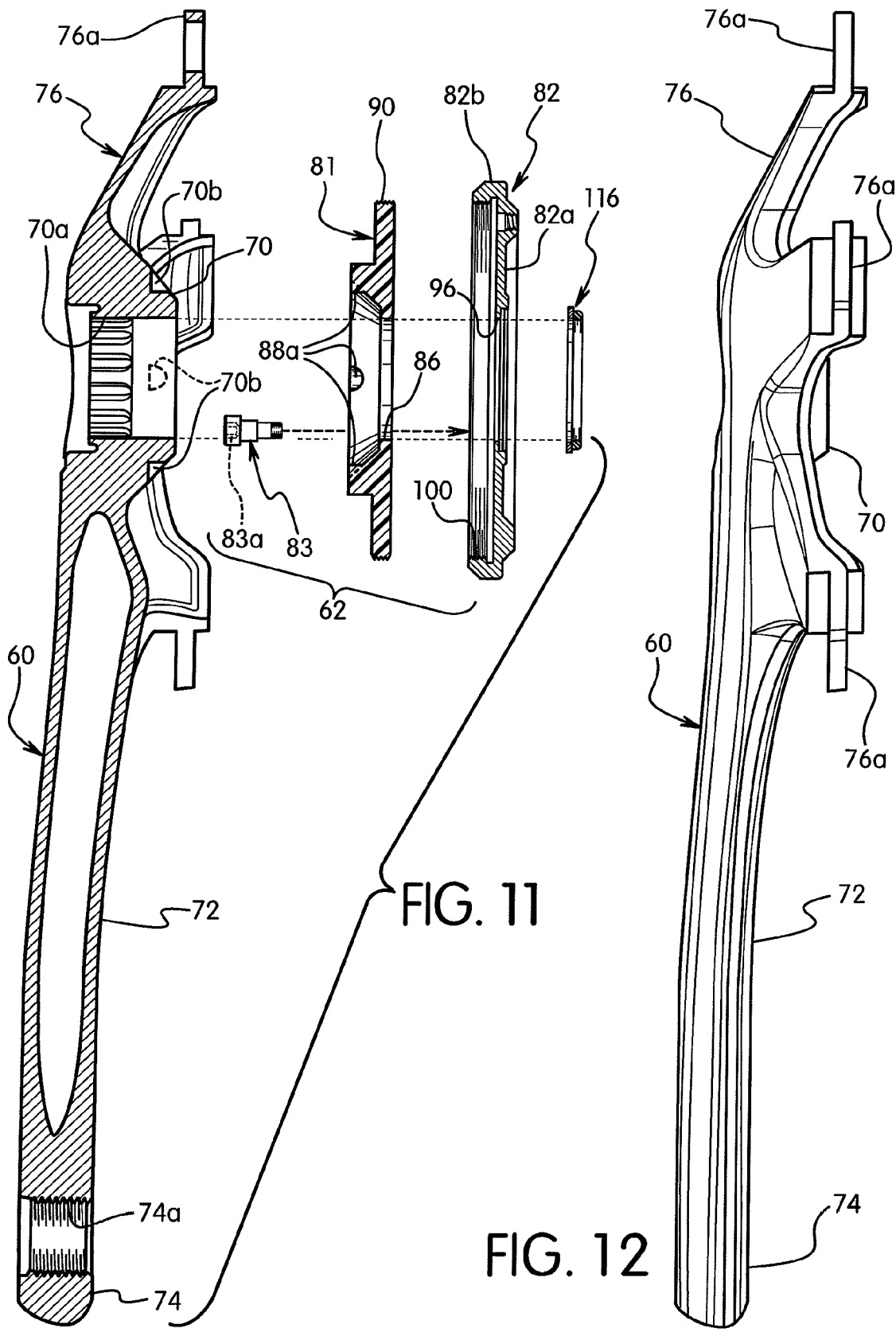

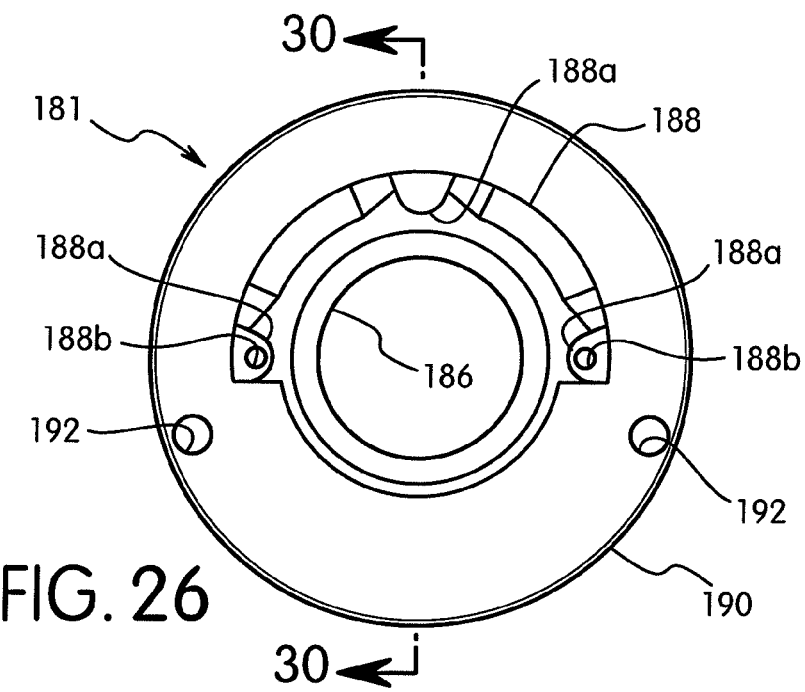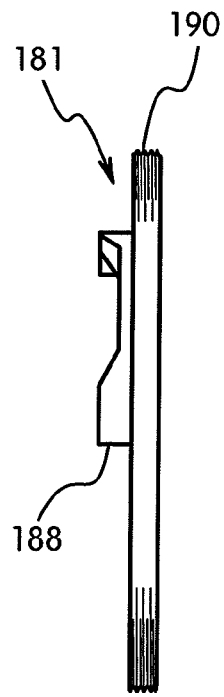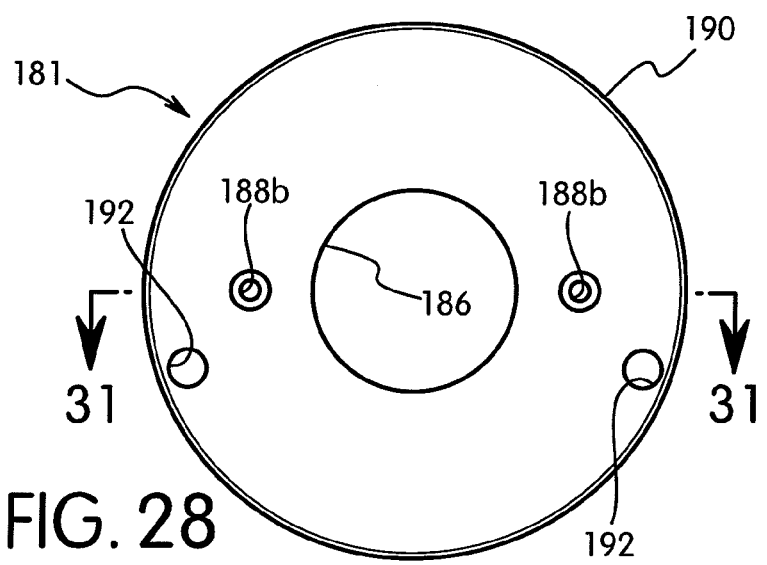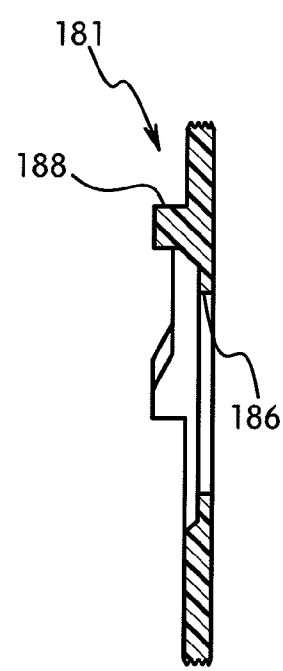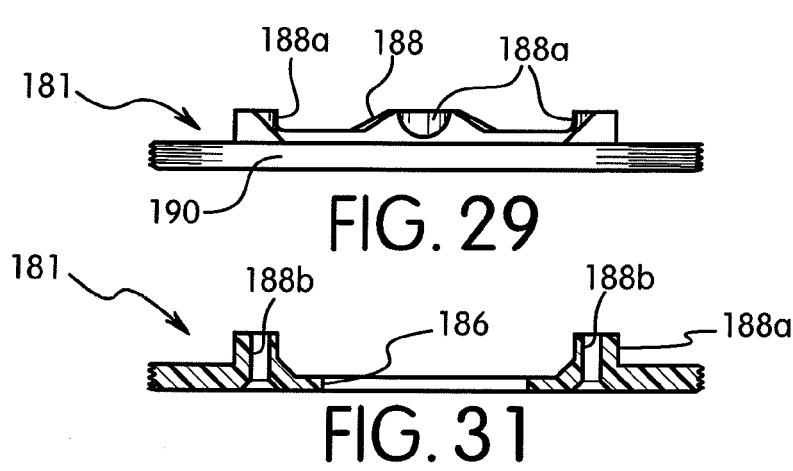
FIG. 26
FIG. 27
FIG. 28
FIG. 29
FIG. 30
FIG. 31

BICYCLE CRANK ASSEMBLY

BACKGROUND

1. Field of the Invention

This invention generally relates to a bicycle crank assembly. More specifically, the present invention relates to a bicycle crank assembly that includes a axial play adjustment function for adjusting axial play in a crank axle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Typically, the drive train of a bicycle is a chain drive that includes one or more front sprockets and one or more rear sprockets that are connected by a chain. The front sprockets are non-rotatably attached to a crank axle that is rotatably supported in a hanger tube of a bicycle frame. The crank axle also has a crank arm non-rotatably mounted on each end with each crank arm having a pedal attached thereto. Sometimes the right side crank arm has a sprocket mounting part for non-rotatably attaching the front sprockets thereon to form a bicycle crank assembly. In this type of bicycle crank assembly, the right side gear crank is conventionally crimp-fastened to the crank axle. A conventional left side crank arm has a crank axle mounting part with a crank axle mounting hole for the left end of the crank axle. A crank axle mounting part also has a slit extending radially from the crank axle mounting hole and two clamping bolts for narrowing the slit to clamp the left end of the crank axle in the crank axle mounting hole. Furthermore, the left side crank assembly is often fixed to the crank axle by a fixed bolt that screws into the left inner circumferential surface of the crank axle. Some examples of conventional crank assemblies are disclosed in U.S. Patent Publication No. 2006/0101941 (assigned to Shimano Inc.), U.S. Patent Publication No. 2006/0112780 (assigned to Shimano Inc.) and U.S. Patent Publication No. 2007/0062328 (assigned to Shimano Inc.).

In the case of a tandem bicycle, the tandem bicycle typically has a front crankset, a timing chain, a rear crankset and a drive chain. The timing chain and the drive chain are connected in series. The front crankset has a front crank axle with a front bicycle crank assembly mounted on a left end of the front crank axle and a crank arm mounted on the right side of the front crank axle. The rear crankset has a rear crank axle with a rear bicycle crank assembly mounted on each end of the rear crank axle. The timing chain connects the front bicycle crank assembly with the rear bicycle crank assembly mounted on the left side of the rear crank axle. The drive chain connects the rear bicycle crank assembly mounted on the right side of the rear crank axle to gears mounted to the rear wheel. This configuration is called a crossover rear drive. The front crankset typically has only one chain ring or sprocket. The rear crankset typically has many chain rings or sprockets, sometimes on both sides. On a tandem bicycle where the pedaling is designed to be in sync, both the front and rear cranksets will use a chain ring for the timing chain of the same size. The chain rings of the right side rear bicycle crank assembly can be a single gear or multiple gears that use a derailleur.

In the case of a tandem bicycle, typically no adjustment mechanism is provided for adjusting axial play in a conventional rear crank axle so that the crank axle rotates smoothly without bearing movement in the axial direction after both of the rear bicycle crank assemblies are mounted to the rear crank axle. Therefore, in many cases, adjustment of axial play is accomplished during fixing of the rear bicycle crank assemblies to the rear crank axle using shims. In this case, the work of axial adjustment becomes complicated since removing one of the rear bicycle crank assembly must be repeated to add and subtract the shims when changing gap using shims during axial play adjustment.

SUMMARY

One aspect is to provide a bicycle crank assembly that includes an axial play adjustment function such that axial play for a crank axle can be adjusted after mounting the bicycle crank assembly to the crank axle.

In view of the state of the known technology, one aspect of the present invention is to provide a bicycle crank assembly that comprises a crank arm and an axial gap adjustment device. The crank arm has a crank axle mounting part, an extension part extending from the crank axle mounting part, a pedal attachment part provided on a radial outer end of the extension part and a sprocket attachment part. The axial gap adjustment device includes an adjustment adapter and an adjustment member. The adjustment adapter has a crank arm engagement structure that non-rotatably engages the crank arm, a first crank axle opening, and a first screw part. The adjustment member has a second crank axle opening, and a second screw part threadedly engaged with the first screw part to selectively position the adjustment member relative to the adjustment adapter.

BRIEF DESCRIPTION OF THE DRAWINGS

Referring now to the attached drawings which form a part of this original disclosure:

FIG. 8 is an outside elevational view of the axial gap adjustment device by itself after being removed from the crank axle mounting part of the crank arm;

FIG. 9 is a cross sectional view of the axial gap adjustment device as seen along section line 9-9 of FIG. 8;

FIG. 10 is an enlarged partial cross sectional view of the adjustment member of the axial gap adjustment device installed on the crank axle to show the sealing member;

FIG. 11 is an exploded cross sectional view of the crank arm and the axial gap adjustment device;

FIG. 12 is a front side elevational view of the left side crank arm with the axial gap adjustment device removed from the crank arm;

FIG. 26 is an inside elevational view of the adjustment adapter of the axial gap adjustment device illustrated in FIG. 24;

FIG. 27 is an edge view of the adjustment adapter of the axial gap adjustment device illustrated in FIG. 26;

FIG. 28 is an outside elevational view of the adjustment adapter of the axial gap adjustment device illustrated in FIGS. 26 and 27;

FIG. 29 is another edge view of the adjustment adapter of the axial gap adjustment device illustrated in FIGS. 26 to 28;

FIG. 30 is a cross sectional view of the adjustment adapter of the axial gap adjustment device as seen along section line 30-30 of FIG. 26;

FIG. 31 is a cross sectional view of the adjustment adapter of the axial gap adjustment device as seen along section line 31-31 of FIG. 26.

DETAILED DESCRIPTION OF ILLUSTRATED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
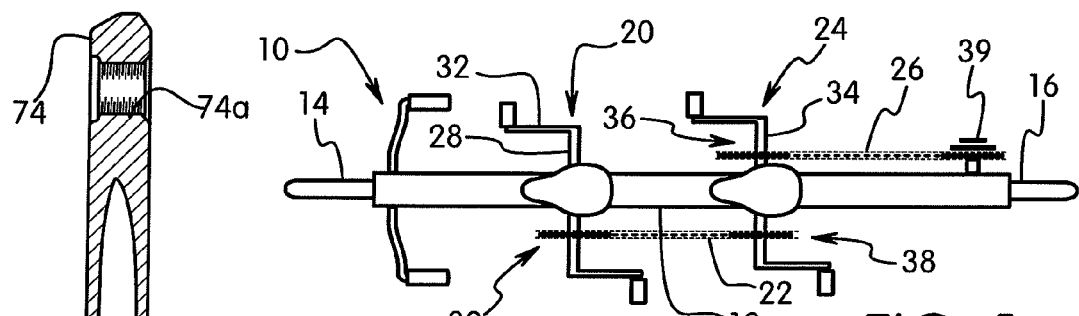
FIG. 1 is a simplified top diagrammatic view of a tandem bicycle that is equipped with a rear crankset in accordance with one embodiment.

Referring initially to FIG. 1, a tandem bicycle 10 is illustrated with a crossover rear drive in accordance with a first embodiment. As seen in FIG. 1, the bicycle 10 includes, among other things, a frame 12 that is supported by a front wheel 14 and a rear wheel 16. The crossover rear drive of the tandem bicycle 10 mainly includes a front crankset 20, a timing chain 22, a rear crankset 24 and a drive chain 26. Of course, the crossover rear drive of the tandem bicycle 10 includes other components such as shift operating devices, derailleurs, etc.

The timing chain 22 and the drive chain 26 are connected in series. The front crankset 20 has a front crank axle 28 with a front bicycle crank assembly 30 mounted on a left end of the front crank axle 28 and a right crank arm 32 mounted on the right side of the front crank axle 28. The rear crankset 24 has a rear crank axle 34 with a right side rear bicycle crank assembly 36 mounted on the right side of the rear crank axle 34 and a left side rear bicycle crank assembly 38 mounted on the left side of the rear crank axle 34. The timing chain 22 connects the front bicycle crank assembly 30 to the left side rear bicycle crank assembly 38. The drive chain 26 connects the right side rear bicycle crank assembly 36 to gears 39 mounted to the rear wheel 16.

The front crankset 20 can be any type of front crankset as needed and/or desired such as the one disclosed U.S. Patent Publication No. 2007/0062328 (assigned to Shimano Inc.). The timing chain 22 and the drive chain 26 are conventional bicycle parts. Thus, the front crankset 20, the timing chain 22 and the drive chain 26 will not be discussed and/or illustrated in further detail herein.

Figure 2:
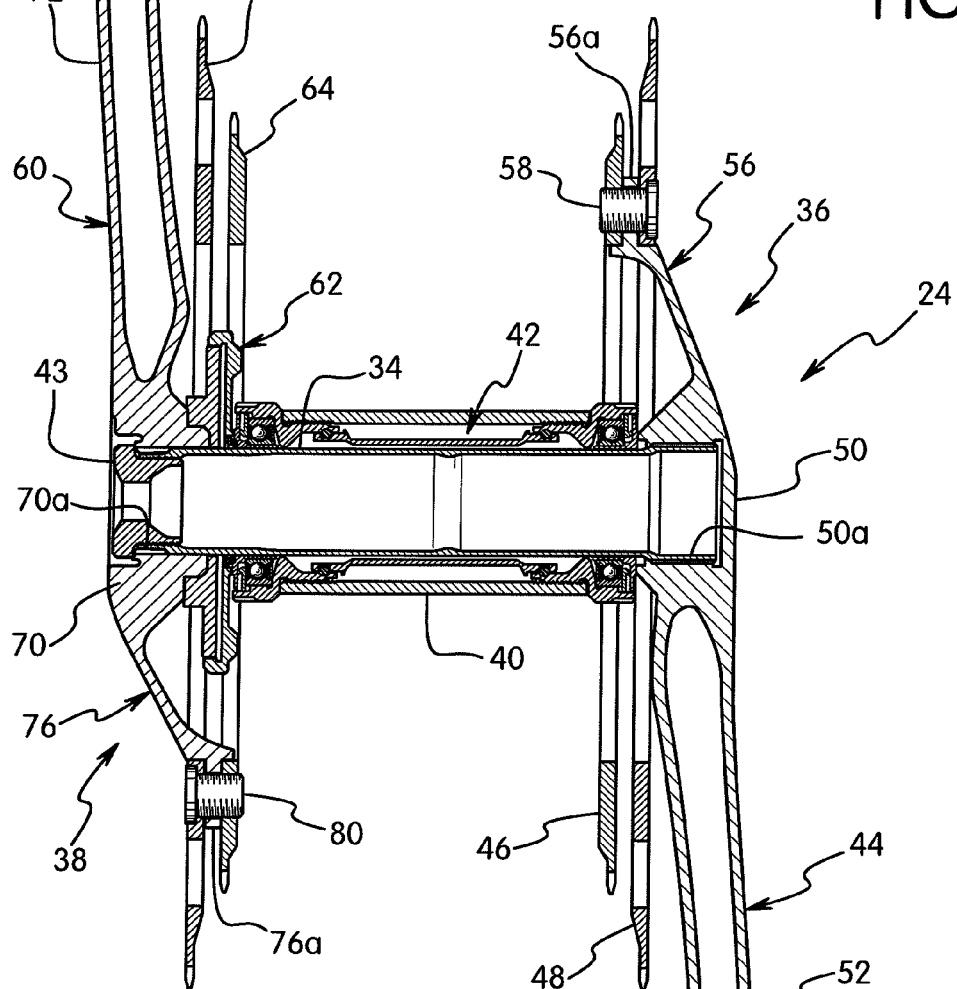
FIG. 2 is a transverse cross sectional view of the rear crankset having a left side bicycle crank axle assembly in accordance with the illustrated embodiment.

Referring now to FIG. 2, the rear crankset 24 will be discussed in more detail. The rear crank axle 34 rotatably supported on a hanger part 40 of the frame 12 by a bottom bracket 42 (e.g., a crank axle bearing assembly) that is fixedly mounted in the hanger part 40. The right side rear bicycle crank assembly 36 is fixed on the right end of the rear crank axle 34 by crimping, welding or the like. The left side rear bicycle crank assembly 38 is removably mounted on the left end of the rear crank axle 34.

Figure 3:
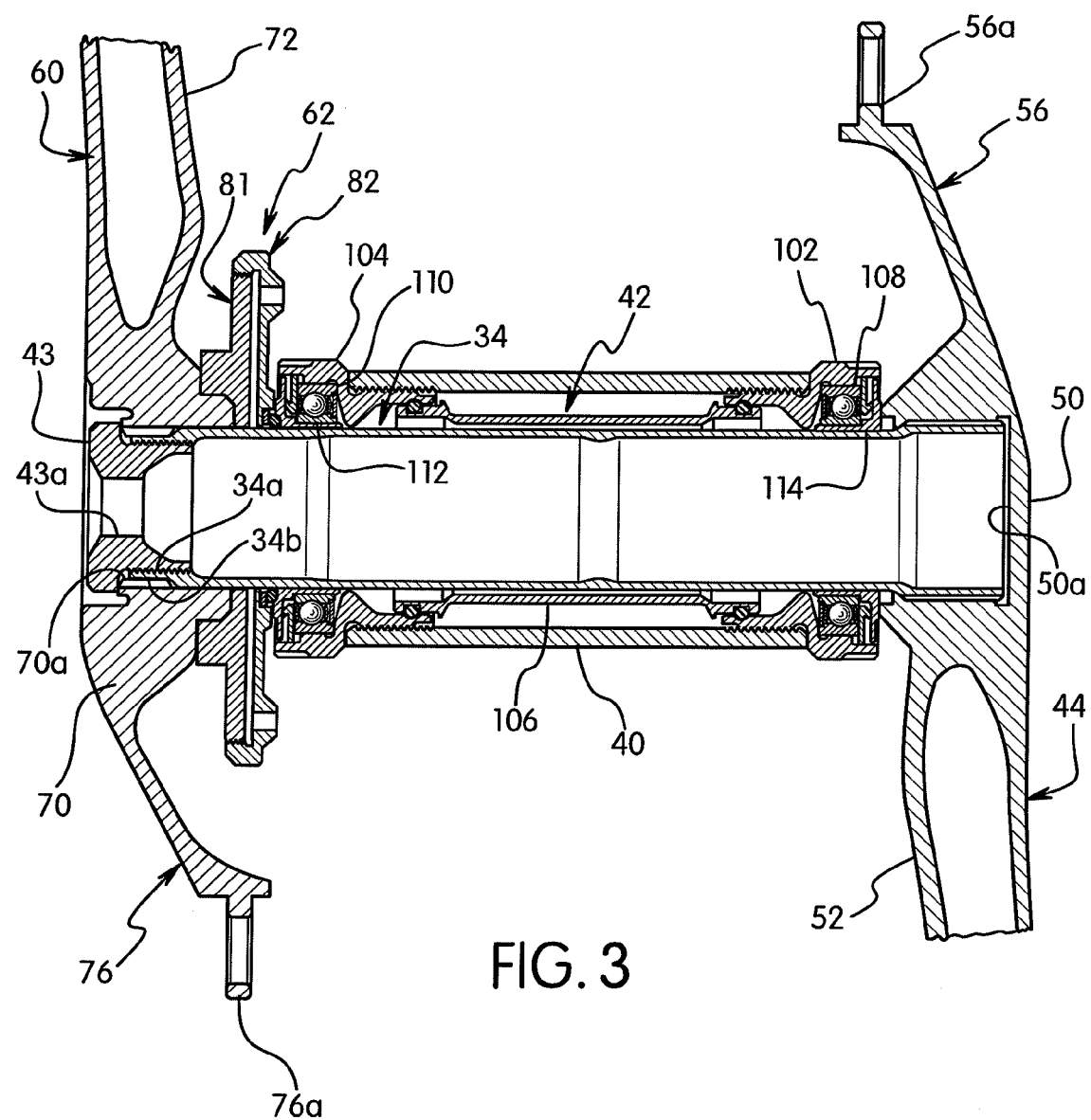
FIG. 3 is an enlarged partial cross sectional view of a portion of the rear crankset illustrated in FIG. 2 that shows the bicycle crank axle assemblies attached to opposite ends of the crank axle.

Referring now to FIG. 3, the rear crank axle 34 is preferably an alloy hollow pipe-shaped member that is highly rigid such as chrome molybdenum steel. In addition, as shown in FIG. 3, the left end portion of the rear crank axle 34 includes a female (internal threads) screw part 34a and a plurality of external serrations or splines 34b. The female (internal threads) screw part 34a is disposed on an inner circumferential surface of the left end portion of the rear crank axle 34 so that a fixed bolt 43 is screwed into the female screw part 34a to fasten the left side rear bicycle crank assembly 38. The fixed bolt 43 has a tool anchor hole 43a used for tightening, such as an Allen wrench or the like, in the center of the outer circumferential surface. The splines 34b of the rear crank axle 34 engage splines or serrations formed in the inner end portion of the left side rear bicycle crank assembly 38 to non-rotatably link the left side rear bicycle crank assembly 38 to the rear crank axle 34.

Referring back to FIG. 2, the right side rear bicycle crank assembly 36 includes a right crank arm 44 and a pair of chain rings or sprockets 46 and 48. The right crank arm 44 has a crank axle mounting part 50, a hollow extension part 52 extending from the crank axle mounting part 50, a pedal attachment part 54 provided on a radial outer end of the extension part 52 and a sprocket attachment part 56 positioned on the opposite side of the pedal attachment part 54 with respect to the extension part 52. Preferably, the crank axle mounting part 50, the extension part 52, the pedal attachment part 54 and the sprocket attachment part 56 are integrally formed as a one-piece, unitary member from a suitable rigid material such as aluminum. The crank axle mounting part 50 has a blind bore 50a in which the right end of the rear crank axle 34 is attached by crimping, welding, press fitting or the like. The pedal attachment part 54 includes a threaded hole 54a for attaching a pedal thereto. The sprocket attachment part 56 is formed of a plurality of attachment members or arms 56a extending outward from the crank axle mounting part 50 to free ends. The attachment arms 56a of the sprocket attachment part 56 are sometimes referred to as a spider. The chain rings or sprockets 46 and 48 are mounted on the attachment arms 56a of the sprocket attachment part 56 via a plurality of fasteners 58 (only one shown) in a removable manner.

Still mainly referring to FIG. 2, the left side rear bicycle crank assembly 38 includes a left crank arm 60, an axial gap adjustment device 62, and a pair of chain rings or sprockets 64 and 66. The left crank arm 60 has a crank axle mounting part 70, a hollow extension part 72 extending from the crank axle mounting part 70, a pedal attachment part 74 provided on a radial outer end of the extension part 72 and a sprocket attachment part 76 positioned on the opposite side of the pedal attachment part 74 with respect to the extension part 72. Preferably, the crank axle mounting part 70, the extension part 72, the pedal attachment part 74 and the sprocket attachment part 76 are integrally formed as a one-piece, unitary member from a suitable rigid material such as aluminum. The crank axle mounting part 70 has a crank axle receiving hole 70a in which the right end of the rear crank axle 34 is attached by the fixing bolt 43. The crank axle receiving hole 70a is a partially splined through bore is configured to non-rotatably engage mating splines of on the left end of the rear crank axle 34. The pedal attachment part 74 includes a threaded hole 74a for attaching a pedal thereto.

Figure 5:
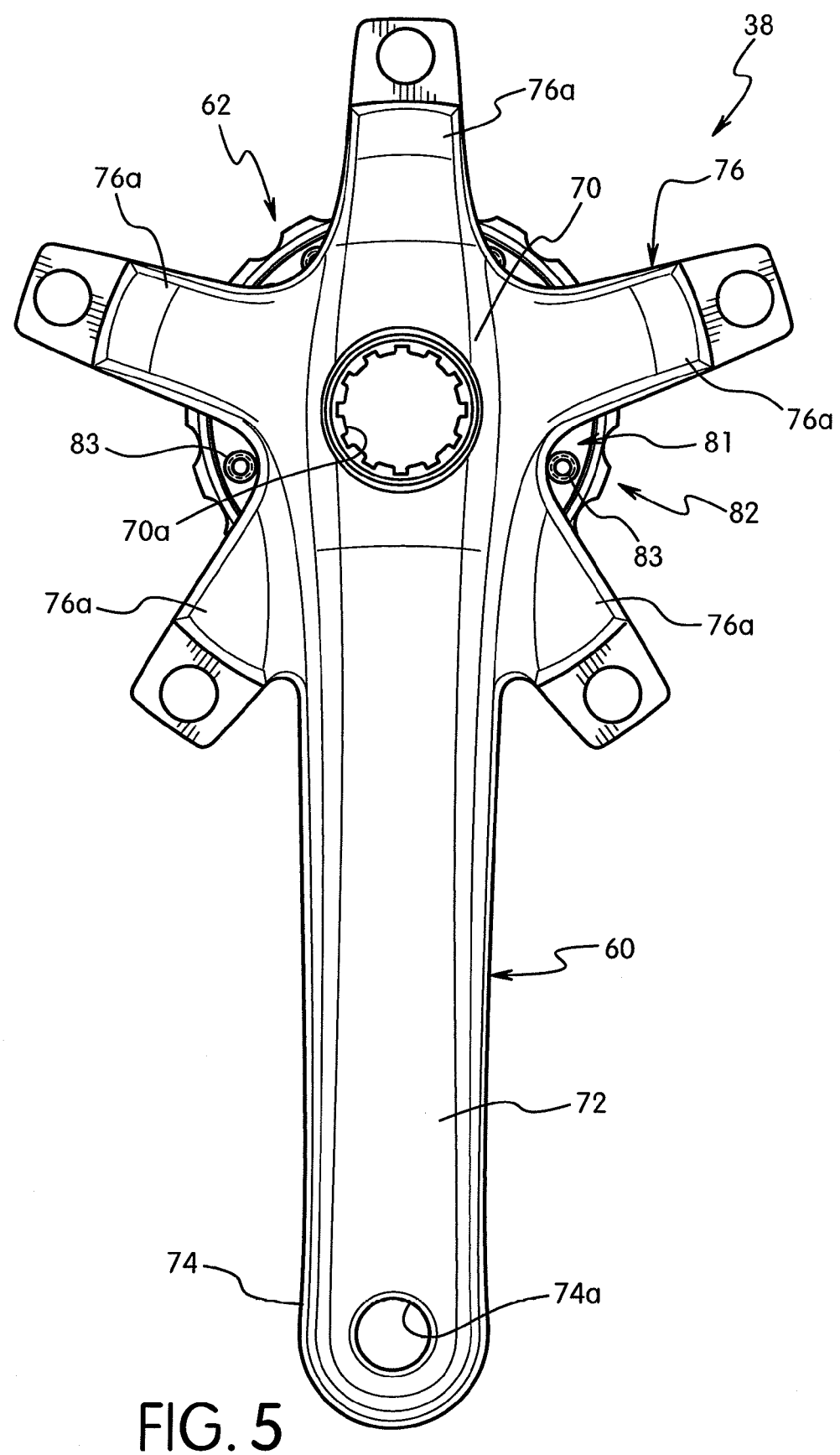
FIG. 5 is an outside elevational view of the left side bicycle crank axle assembly illustrated in FIGS. 2 to 4 with an axial gap adjustment device mounted thereto.
Figure 6:
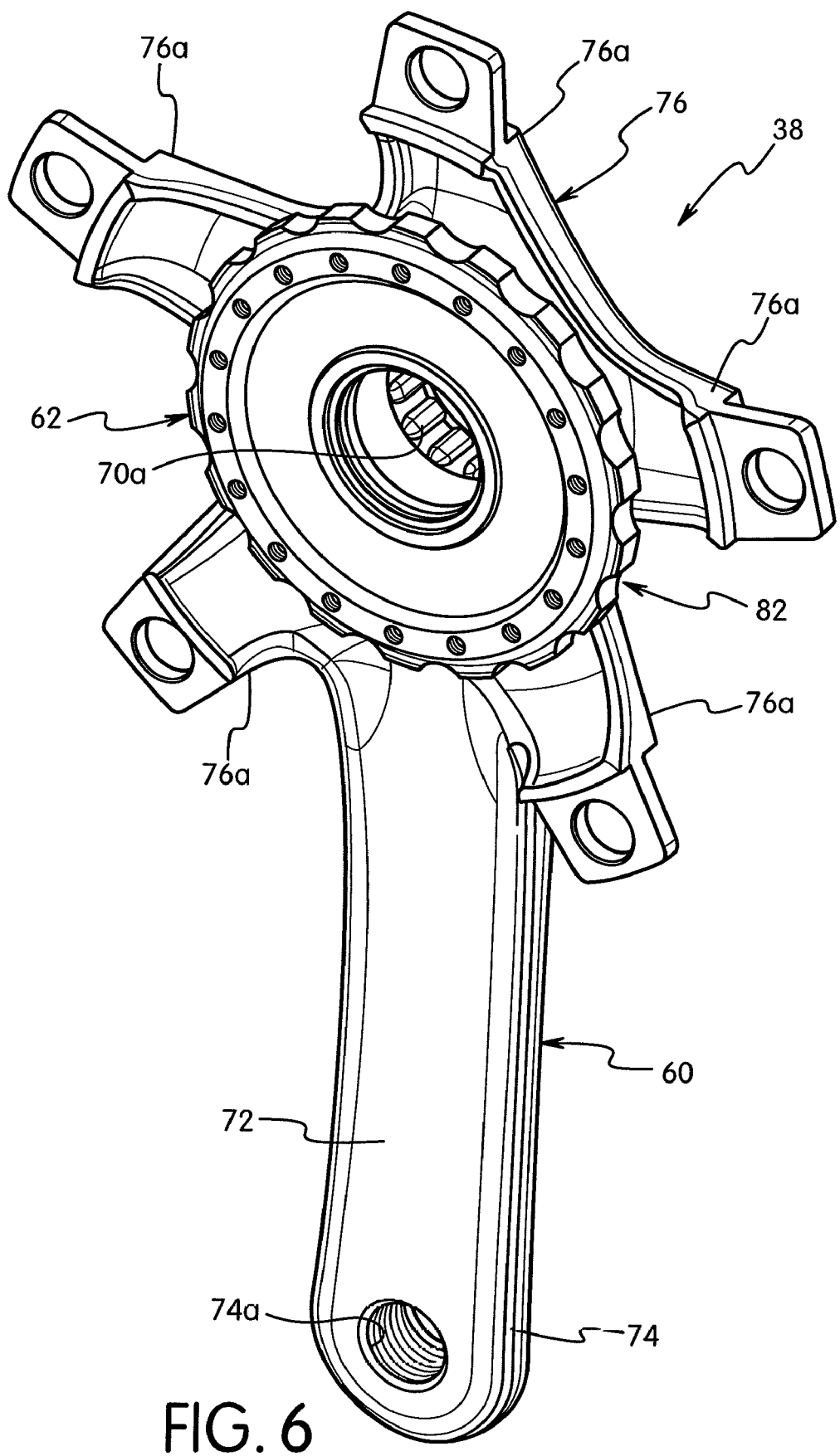
FIG. 6 is an inside perspective view of the left side bicycle crank axle assembly illustrated in FIGS. 2 to 5 with an axial gap adjustment device mounted thereto.
Figure 7:
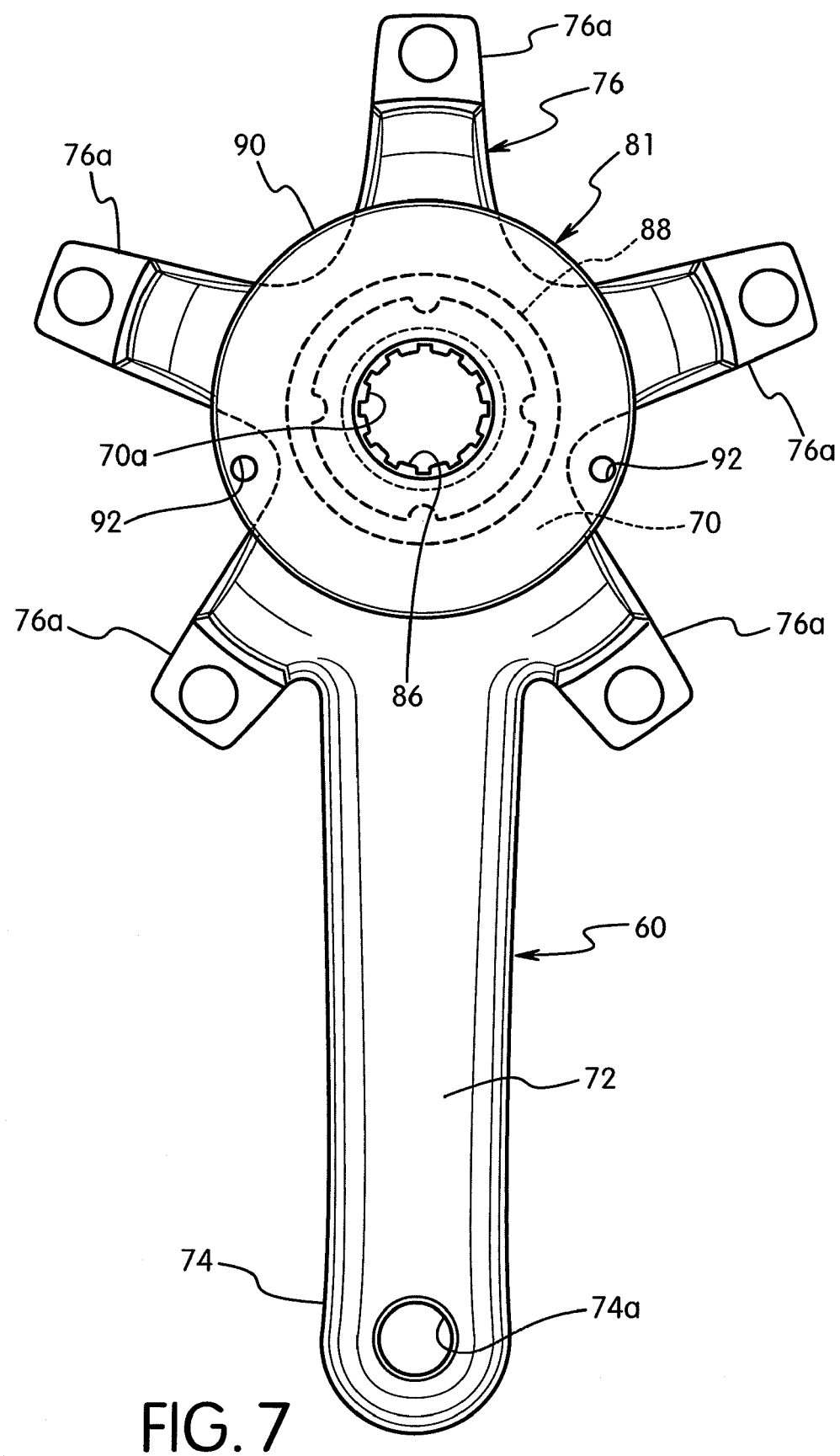
FIG. 7 is an inside elevational view of the left side bicycle crank axle assembly illustrated in FIGS. 2 to 4 with the adjustment adapter of the axial gap adjustment device mounted to the crank axle mounting part of the crank arm.

As best seen in FIGS. 5 to 7, the sprocket attachment part 76 includes a plurality of attachment members or arms 76a extending outward from the crank axle mounting part 70 to free ends. The attachment arms 76a of the sprocket attachment part 76 are sometimes referred to as a spider. As seen in FIG. 2, the chain rings or sprockets 64 and 66 are mounted on the attachment arms 76a of the sprocket attachment part 76 via a plurality of fasteners 80 (only one shown) in a removable manner.

Referring now to FIGS. 5 to 11, the axial gap adjustment device 62 includes an adjustment adapter 81 and an adjustment member 82. Preferably, the axial gap adjustment device 62 further includes a pair of locking pins 83. Basically, the axial gap adjustment device 62 is positioned on the rear crank axle 34 between the bottom bracket 42 and the crank axle mounting part 70 of the left crank arm 60. The adjustment adapter 81 and the adjustment member 82 adjustably mate together so as to perform an axial play adjustment function such that axial play in the bottom bracket 42 can be adjusted after mounting the bicycle crank assembly to rear crank axle 34. Since the left crank arm 60 is a separate member from the adjustment adapter 81 and the adjustment member 82, the left crank arm 60 can be constructed of a material that is different from the adjustment adapter 81 and the adjustment member 82. Moreover, by the left crank arm 60 being a separate member from the adjustment adapter 81 and the adjustment member 82, the left crank arm 60 can be constructed more easily and less expensively formed.

Referring now to FIGS. 14 to 18, the adjustment adapter 81 will now be discussed in more detail. The adjustment adapter 81 has a first crank axle opening 86, a crank arm engagement structure 88, a first screw part 90 and a pair of first locking holes 92. The adjustment adapter 81 is dimensioned so as to be visible and accessible between the attachment members or arms 56a as viewed along a center longitudinal axis of the first crank axle opening 86 from an outer side of the left crank arm 60 that faces away from the axial gap adjustment device 62. The adjustment adapter 81 is generally a disc shaped member with the first crank axle opening 86 being centrally located. The first crank axle opening 86 is dimensioned to receive the rear crank axle 34 therethrough. Preferably, the first crank axle opening 86 has a minimum diameter that is equal to or slightly larger than the diameter of the rear crank axle 34.

Figure 13:
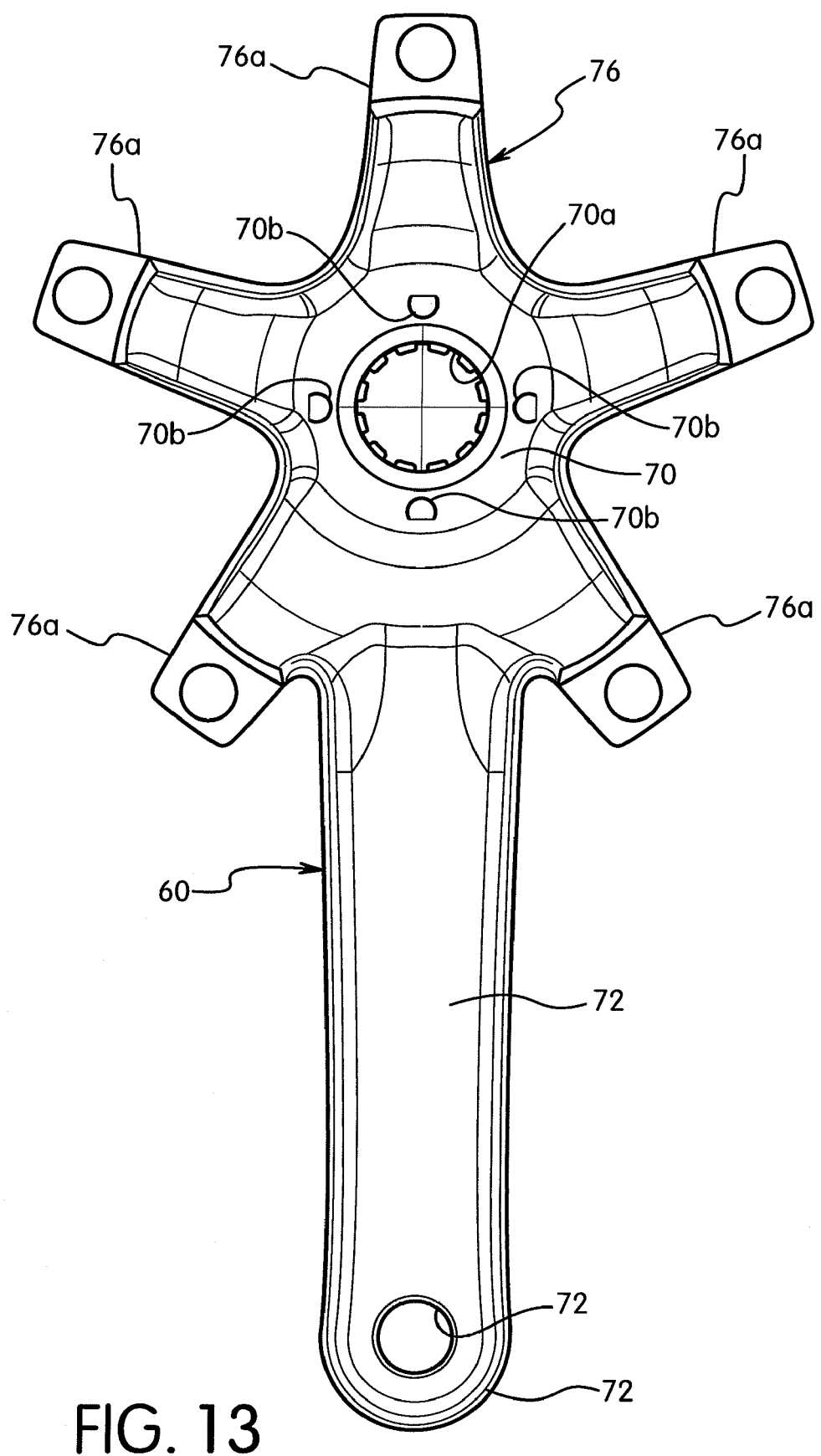
FIG. 13 is an inside elevational view of the left side crank arm with the axial gap adjustment device removed from the crank arm.
Figure 14:
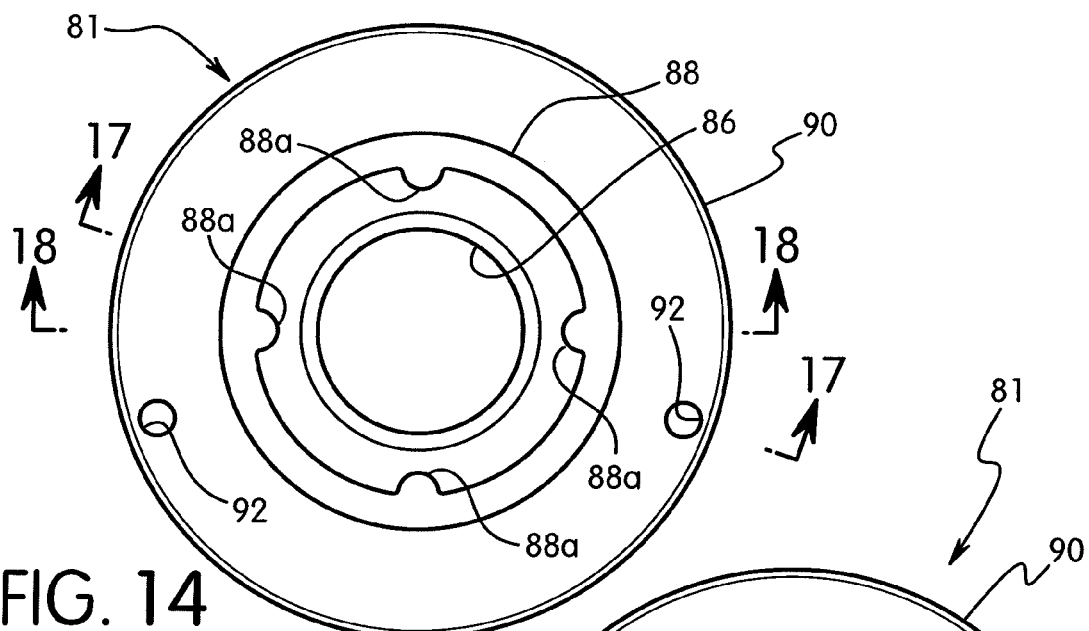
FIG. 14 is an outside elevational view of the adjustment adapter of the axial gap adjustment device.
Figure 15:
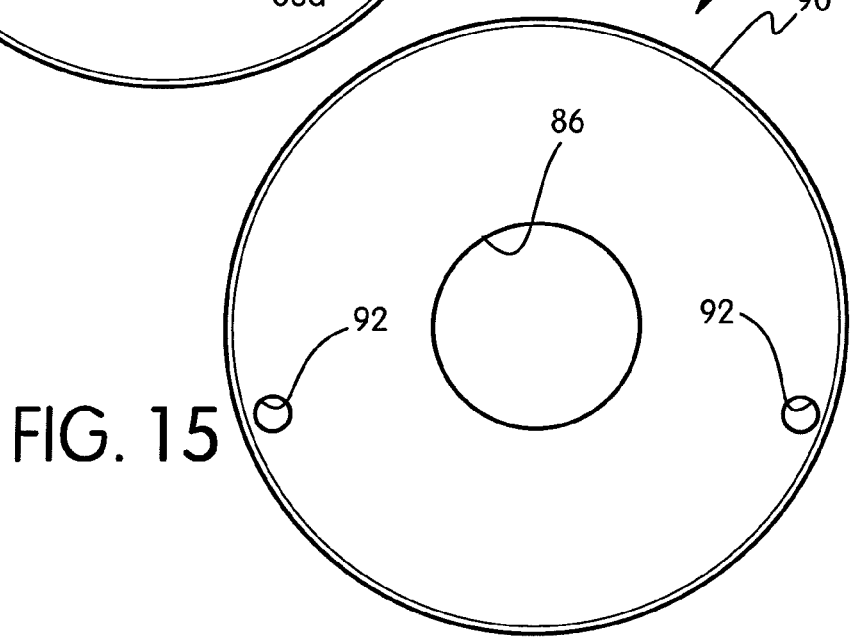
FIG. 15 is an inside elevational view of the adjustment adapter of the axial gap adjustment device.

Referring back to FIGS. 7 and 9, the crank arm engagement structure 88 non-rotatably engages the crank axle mounting part 70 of the left crank arm 60. In this embodiment, as best seen in FIGS. 8, 9 and 11, the crank arm engagement structure 88 is formed by four protrusions 88a that mate with four recesses 70b of the crank axle mounting part 70 of the left crank arm 60. As seen in FIG. 13, the recesses 70b are circumferentially and equally spaced apart around the crank axle receiving hole 70a. When the protrusions 88a mate with the recesses 70b as seen in FIG. 9, the adjustment adapter 81 is prevented from rotating on the rear crank axle 34 relative to the left crank arm 60. In this embodiment, the crank arm engagement structure 88 merely mates with the crank axle mounting part 70 of the left crank arm 60 such that the crank arm engagement structure 88 is held after the left crank arm 60 has been mounted on the rear crank axle 34. Of course, it will be apparent from this disclosure that the protrusions 88a mate with the recesses 70b such that the adjustment adapter 81 is frictionally held in place on the left crank arm 60 prior to mounting the left crank arm 60 on the rear crank axle 34.

Figure 4:
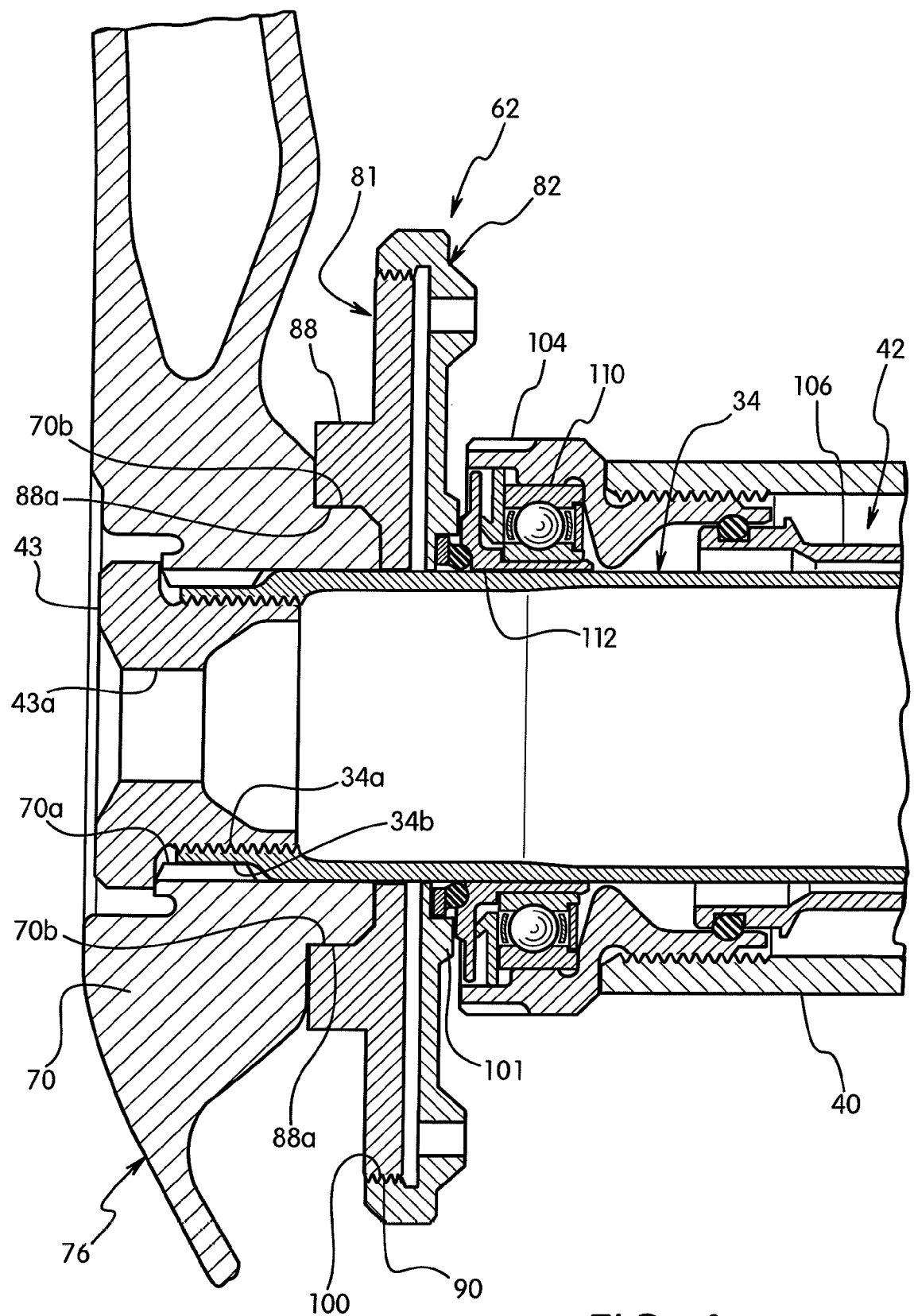
FIG. 4 is a further enlarged partial cross sectional view of a left side portion of the rear crankset illustrated in FIGS. 2 and 3.
Figure 16:
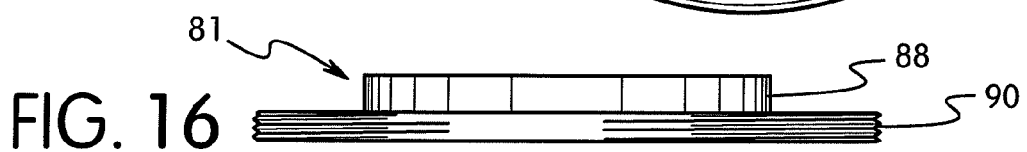
FIG. 16 is an edge view of the adjustment adapter of the axial gap adjustment device.
Figure 17:
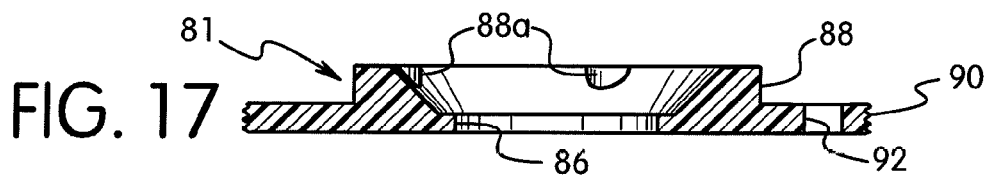
FIG. 17 is a cross sectional view of the adjustment adapter of the axial gap adjustment device as seen along section line 17-17 of FIG. 14.
Figure 18:
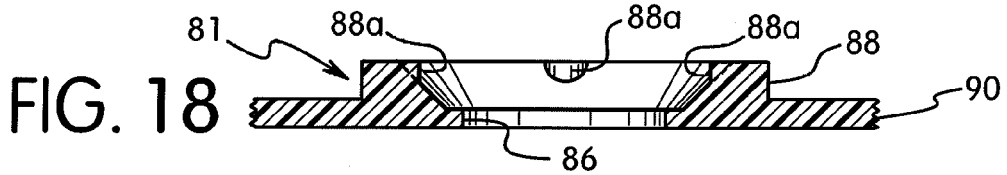
FIG. 18 is a cross sectional view of the adjustment adapter of the axial gap adjustment device as seen along section line 18-18 of FIG. 14.
Figure 19:
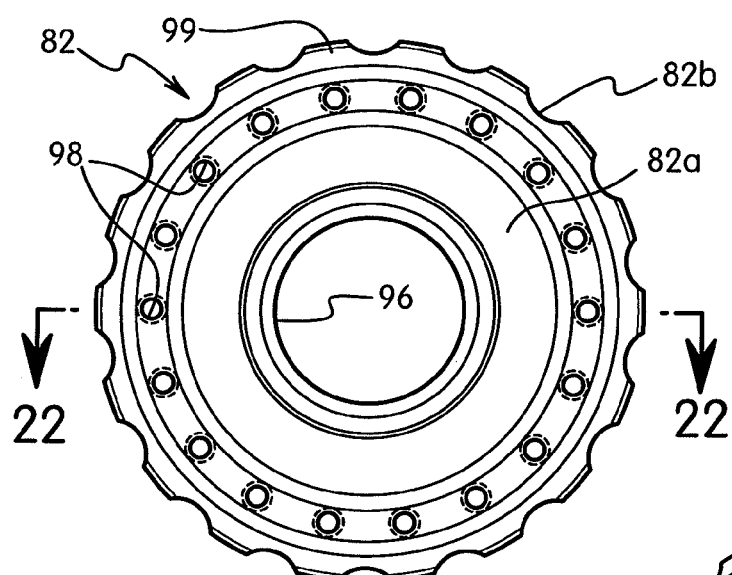
FIG. 19 is an outside elevational view of the adjustment member of the axial gap adjustment device.
Figure 20:
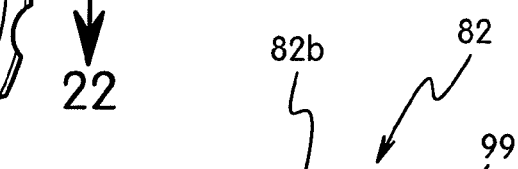
FIG. 20 is an inside elevational view of the adjustment member of the axial gap adjustment device.
Figure 21:
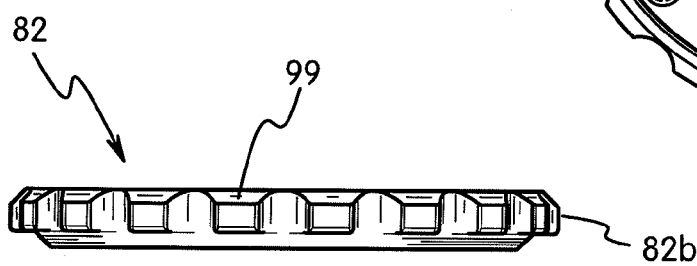
FIG. 21 is an edge view of the adjustment member of the axial gap adjustment device.
Figure 22:
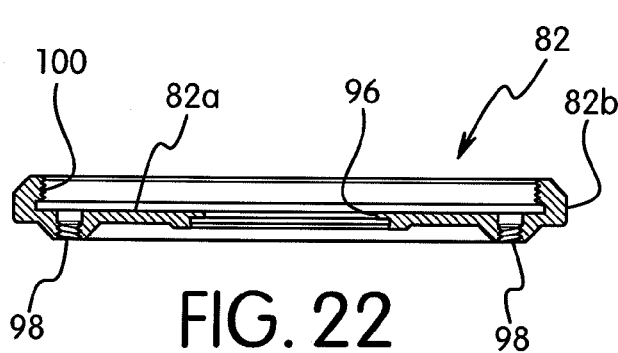
FIG. 22 is a cross sectional view of the adjustment member of the axial gap adjustment device as seen along section line 22-22 of FIG. 19.
Figure 23:
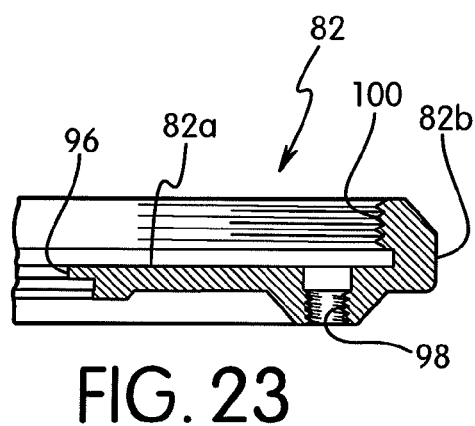
FIG. 23 is a partial cross sectional view of the adjustment member of the axial gap adjustment device illustrated in FIG. 22.

In this embodiment, as best seen in FIG. 16, the first screw part 90 is a male thread (i.e., a male screw part) that is formed on the outer peripheral edge of the adjustment adapter 81. As best seen in FIGS. 4 and 9, the first screw part 90 threadedly engages the adjustment member 82 such that rotation of the adjustment member 82 relative to the adjustment adapter 81 causes an effective axial width of the axial gap adjustment device 62. The first locking holes 92 are non-threaded holes that are dimensioned to snugly receive the locking pins 83. When the adjustment adapter 81 is mounted on the left crank arm 60, the locking holes 92 are positioned with respect to the left crank arm 60 such that the locking holes 92 are accessible as viewed along the center longitudinal axis of the locking holes 92 from an outer side of the left crank arm 60 that faces away from the axial gap adjustment device 62. In this embodiment, the locking holes 92 are positioned in the gaps between adjacent ones of the attachment arms 76a so that the locking pins 83 can be inserted into the locking holes 92 and then rotated with a tool while the adjustment adapter 81 is mounted on the left crank arm 60.

Referring now to FIGS. 19 to 23, the adjustment member 82 will now be discussed in more detail. The adjustment member 82 is generally a disc shaped member. The adjustment member 82 has a disc shaped part 82a and a tube-shaped fixing part 82b. The disc shaped part 82a of the adjustment member 82 has a second crank axle opening 96 and a plurality of second locking holes 98. The tube-shaped fixing part 82b has a rotation operation part 99 formed on an outer circumferential surface of the tube-shaped fixing part 82b, and a second screw part 100 formed on an inner circumferential surface of the tube-shaped fixing part 82b.

The rotation operation part 99 is configured and arranged to assist in rotating the adjustment member 82. In this embodiment, the rotation operation part 99 is formed by a plurality of alternating projections and recesses. The second screw part 100 threadedly engages the first screw part 90 to selectively position a contact surface 101 of the adjustment member 82 relative to the adjustment adapter 81 in response to rotation of the adjustment member 82 by turning the rotation operation part 99. In this embodiment, the second screw part 100 is a female screw part that threadedly engages the first screw part 90 to change an axial position of the contact surface 101 of the adjustment member 82 with respect to the rear crank axle 34.

The adjustment member 82 is dimensioned so as to be visible and accessible between the attachment members or arms 56a as viewed along center longitudinal axes of the second crank axle opening 96 from an outer side of the left crank arm 60 that faces away from the axial gap adjustment device 62.

The second crank axle opening 96 is centrally located in the disc shaped part 82a of the adjustment member 82. The second crank axle opening 96 is dimensioned to receive the rear crank axle 34 therethrough as seen in FIG. 4. Preferably, the second crank axle opening 96 is equal to or slightly larger than the diameter of the rear crank axle 34. The second locking holes 98 are arranged in a circular pattern around the second crank axle opening 96. The second locking holes 98 are threaded holes that selectively receive the locking pins 83. The locking pins 83 are selectively coupled between the adjustment adapter 81 and the adjustment member 82 to lock relative axial movement between the adjustment adapter 81 and the adjustment member 82 via the first and second screw parts 90 and 100. Thus, the adjustment adapter 81 and the adjustment member 82 can be selectively locked in a plurality of different adjustment positions in which the axial dimension of the axial gap adjustment device 62 changes with each of the different adjustment positions.

While the adjective "first" is used to describe the parts of the adjustment adapter 81 and the adjective "second" is used to describe the parts of the adjustment member 82, the adjectives "first" and "second" are merely used as identifiers, and thus, are interchangeable. Moreover, certain features of the adjustment adapter 81 can be switched with certain features of the adjustment member 82. For example, one of the adjustment adapter 81 and the adjustment member 82 includes a plurality of first locking holes arranged about a corresponding one of the first and second crank axle openings, and the other of the adjustment adapter 81 and the adjustment member 82 includes at least one second locking hole with the locking pin 83 being engaged with one of the first locking holes and the at least one second locking hole while the locking pin 83 is in a locking position. Also though the first screw part is the male screw part 90, and the second screw part is a female screw part 100 in the above embodiment, the reverse disposition is also possible.

The locking pins 83 have center longitudinal axes that are parallel to a center longitudinal axis of the first and second crank axle openings 86 and 96. Each of the locking pins 83 has a tool engagement part 83a at one end that is visible and accessible as viewed along the center longitudinal axis of the locking pins 83 from an outer side of the left crank arm 60 that faces away from the axial gap adjustment device 62. With this arrangement, a tool can easily engage the tool engagement parts 83a of the locking pins 83 while both of the rear bicycle crank assemblies 36 and 38 are mounted on the ends of the rear crank axle 34 to lock the axial gap adjustment device 62 a selected one of the adjustment positions.

Referring back to FIG. 3, the bottom bracket 42 includes a pair (right and left) of bearing housings 102 and 104, a tube-shaped dust cover 106, a pair (right and left) of axle bearings 108 and 110 and a pair (right and left) of cover members 112 and 114. The axle bearing housings 102 and 104 are screwed in from both ends of the hanger part 40. The tube-shaped dust cover 106 concentrically links the right and left axle bearing housings 102 and 104. The right and left axle bearings 108 and 110 are mounted on the right and left axle bearing housings 102 and 104. The right and left cover members 112 and 114 are mounted between the rear crank axle 34 and inner rings of right and left axle bearings 108 and 110. In this embodiment, the left axle bearing 110 constitutes a first bearing and the right axle bearing 108 constitutes a second axle bearing.

In this embodiment, the axle bearings 108 and 110 are preferably industrial type ball bearings or roller bearings. The cover members 112 and 114 are, for example, hard resin members that cover the circumference end surfaces on the axle bearing housings 102 and 104. The cover members 112 and 114 are disposed so that the cover members 112 and 114 are sandwiched by the right and left crank arms 44 and 60 and the inner rings of the axle bearings 108 and 110, respectively, with the axial gap adjustment device 62 positioned on the rear crank axle 34 between the left crank arm 60 and the cover member 112. By rotating the adjustment member 82 relative to the adjustment adapter 81 and the rear crank axle 34, the adjustment member 82 moves in an axial direction along the rear crank axle 34 so that that an axial position of the contact surface 101 of the adjustment member 82 changes to adjust axial play in the rear crank axle 34. The contact surface 101 has a generally washer shape, with the contact surface 101 projecting toward the cover member 114 at an intermediate part in the radial direction. The contact surface 101 makes contact with the cover member 114, which is in contact with the inner ring of the bearing 110. Thus, the axial gap adjustment member 62 presses the inner ring of the bearing 110 inward in the axial direction (to the left in FIG. 3) via the contact surface 101 and the cover member 114.

A seal member 116 is mounted on the adjustment member 82 to seal the gap between the rear crank axle 34 and the contact surface 101. The seal member 116 preferably has a metal back-up ring 116a, and a flexible synthetic resin body seal ring 116b fixed to the back-up ring 116a by a suitable fixing means, such as, for example, adhesive or the like. Foreign matter and the like are unlikely to penetrate from the contact surface 101 to the crank axle 34 when such a seal member is mounted inside the axial gap adjustment member 62.

The bearings 108 and 110 and the cover members 112 and 114 are first installed beforehand on the bearing housings 102 and 104 when the left crank 52 of the above configuration is mounted on the hanger part 40. Further, the dust cover 106 is mounted beforehand on one or another of the bearing housings 102 and 104. In this state, the bearing housings 102 and 104 are screwed into the female screw parts of the hanger part 40 with a torque on a predetermined range. Next, the right side rear bicycle crank assembly 36 to which the rear crank axle 34 is fixedly coupled is inserted into the right side of the hanger part 40. Then, the axial gap adjustment member 62 and the left side rear bicycle crank assembly 38 are installed on the left end of the rear crank axle 34, with the left crank arm 60 having a rotational phase varying by 180 degrees from the right crank arm 44. At this time, the left side rear bicycle crank assembly 38 is fixed in position with the fixed bolt 43. In this state, the axial gap adjustment member 62 is turned in the thread loosening direction (for example, counterclockwise in FIG. 5) or the thread tightening direction (for example, clockwise in FIG. 5) to adjust the axial play by the contact surface 101 of the axial gap adjustment member 62 pressing against the inner ring of the bearing 110 through the cover member 112. When axial play adjustment is completed, the locking pins 83 are installed. In this way, the axial gap adjustment member 62 is prevented from turning, and the once adjusted axial play is unlikely to change until the next time the left side rear bicycle crank assembly 38 is removed. In this case, the work of adjusting axial play is easily performed by providing the axial gap adjustment member 62.

Figure 24:
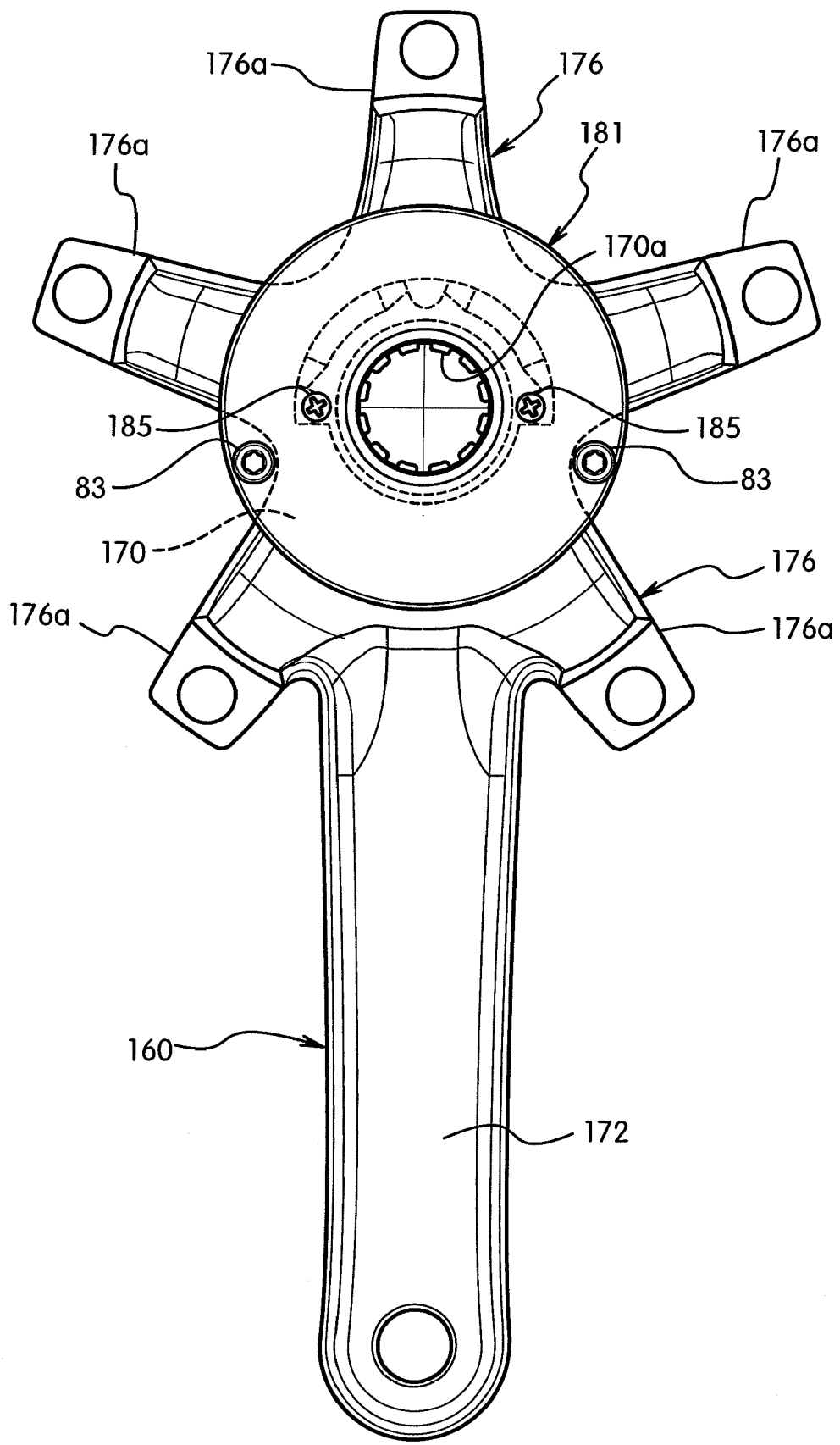
FIG. 24 is an inside elevational view of a left side bicycle crank axle assembly with an adjustment adapter of an axial gap adjustment device according to a second embodiment.
Figure 25:
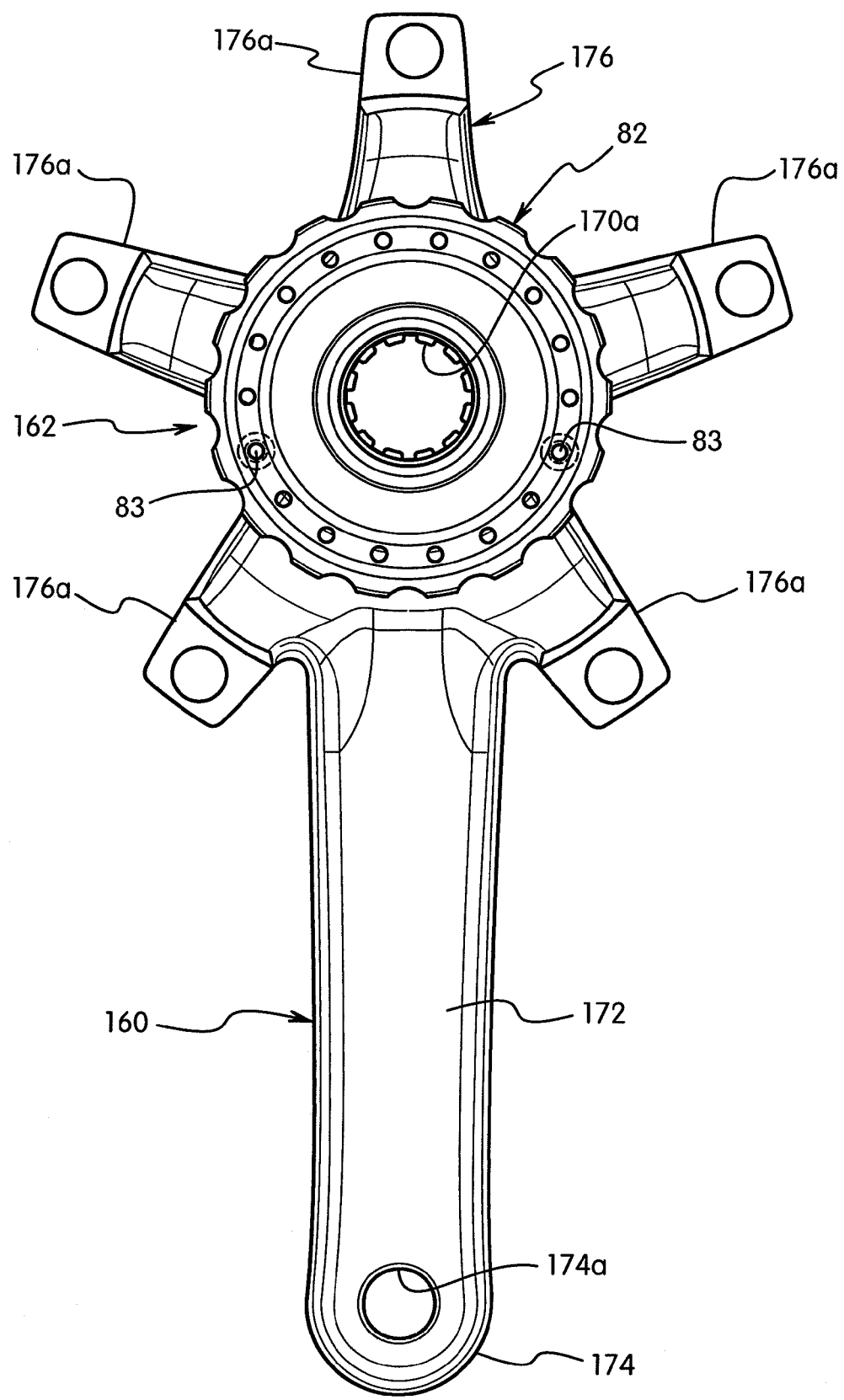
FIG. 25 is an inside elevational view of a left side bicycle crank axle assembly with the axial gap adjustment device according to the second embodiment.

Referring now to FIGS. 24 to 31, a left side rear bicycle crank assembly in accordance with a second embodiment will now be explained. Basically, this bicycle crank assembly of the second embodiment is identical to the left side rear bicycle crank assembly 38 of the first embodiment, except that the adjustment adapter 81 and the left crank arm 60 have been replaced with an adjustment adapter 181 and a left crank arm 160 in which two screws 185 are used to attach the adjustment adapter 181 and the left crank arm 160. Thus, in this second embodiment as seen in FIG. 25, an axial gap adjustment device 162 is provided that includes the adjustment adapter 181, the adjustment member 82 of the first embodiment and the locking pins 83 of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, as seen in FIG. 24, the left crank arm 160 has a crank axle mounting part 170 with a crank axle receiving hole 170a, a hollow extension part 172 extending from the crank axle mounting part 170, a pedal attachment part 174 provided on a radial outer end of the extension part 172 and a sprocket attachment part 176. Similar to the left crank arm 60, the sprocket attachment part 176 of the left crank arm 160 includes a plurality of attachment members or arms 176a extending outward from the crank axle mounting part 170 to free ends. The only difference between the left crank arm 60 and the left crank arm 160 is that the left crank arm 160 has a pair of threaded holes (not shown) for threadedly receiving the screws 185 to attach the adjustment adapter 181 to the left crank arm 160.

As best seen in FIGS. 26 to 31, the adjustment adapter 181 has a first crank axle opening 186, a crank arm engagement structure 188, a first screw part 190 and a pair of first locking holes 192. The only difference between the adjustment adapter 81 and the adjustment adapter 181 is that the crank arm engagement structure 188 of the adjustment adapter 181 has been modified relative to the crank arm engagement structure 88 of the adjustment adapter 81. In this embodiment, the crank arm engagement structure 188 is formed by three protrusions 188a that mate with three of the four recesses (not shown, but identical to the recesses 70b of the left crank arm 60) of the crank axle mounting part 170 of the left crank arm 160. Of course, only three recesses can be formed on the crank axle mounting part 170 so that the number of the recesses on the crank axle mounting part 170 corresponds to the number of the protrusions 188a. Further embodiments can include other types of mating structures between the crank axle mounting part and the adjustment adapter as long as relative rotation between the crank arm and the adjustment adapter is prevented. In other words, for example, the mating structures can include one or more recesses formed on one of the crank axle mounting part and the adjustment adapter, with the other of the crank axle mounting part and the adjustment adapter including one or more mating protrusions such that relative rotation between the crank arm and the adjustment adapter is prevented. In this embodiment, two of the protrusions 188a have mounting holes 188b that receive the screws 185 to more securely attach the adjustment adapter 181 to the left crank arm 160.

Figure 32:
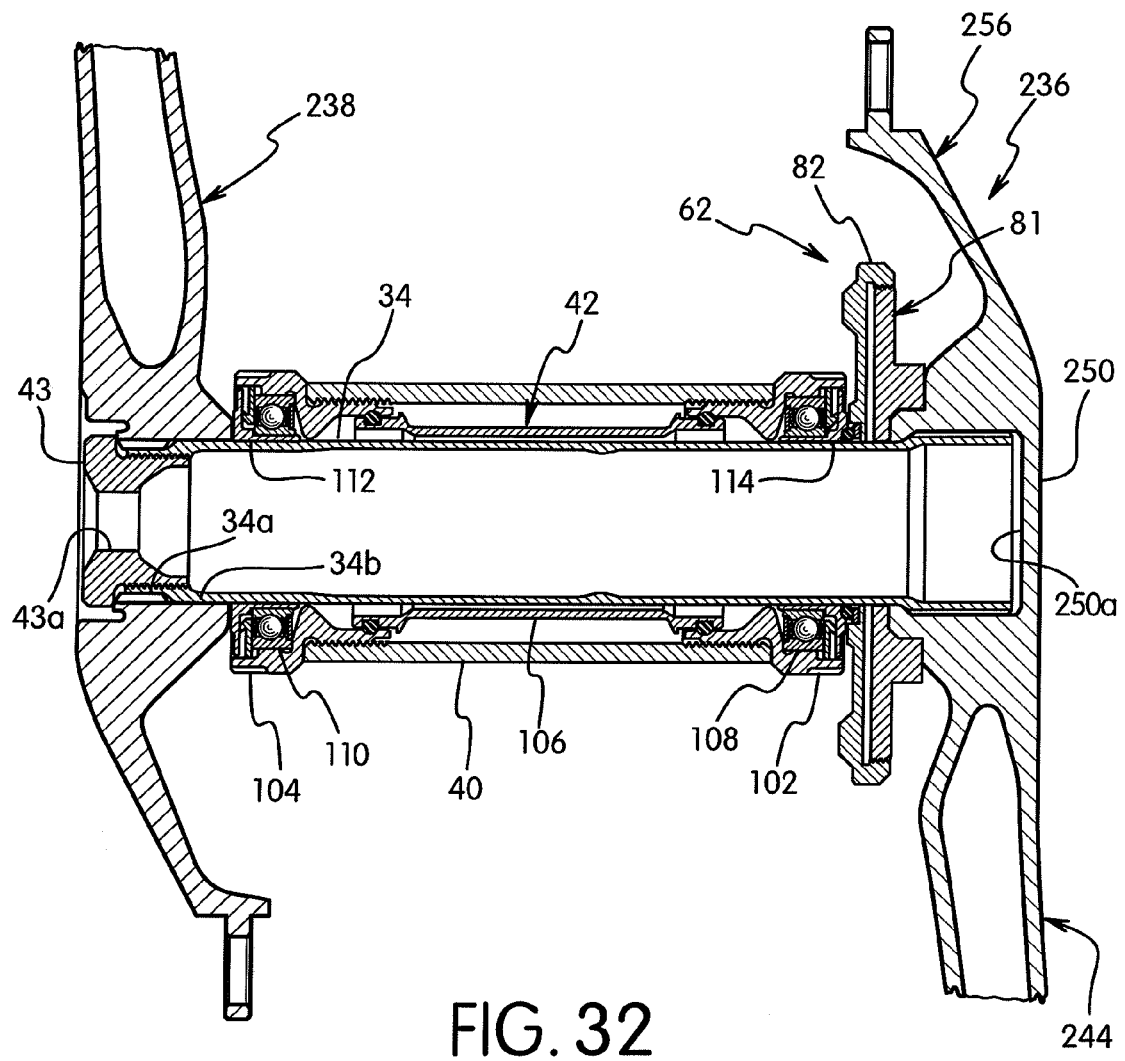
FIG. 32 is a transverse cross sectional view of a rear crankset having a right side bicycle crank axle assembly in accordance with a third embodiment.

Referring now to FIG. 32, a rear crankset is illustrated in which the axial gap adjustment device 62 has been installed on the right side of the hanger part 40 in accordance with a third embodiment. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In this third embodiment, the rear crankset is provided with a right side rear bicycle crank assembly 236 and a left side rear bicycle crank assembly 238 that are mounted to the rear crank axle 34. The right side rear bicycle crank assembly 236 is provided with a crank arm 244 having a crank axle mounting part 250 with a mounting hole 250a and four recesses (not shown) that are identical to the recesses 70b of the left crank arm 60 for mating with the adjustment adapter 81. Other than the addition of recesses (not shown) to the crank axle mounting part 250 of the crank arm 244, the crank arm 244 is identical to the crank arm 44 in accordance with the first embodiment. Thus, the crank arm 244 is crimped onto the right end of the rear crank axle 34, while the left side rear bicycle crank assembly 238 is attached to the rear crank axle 34 by the fixing bolt 43.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle crank assembly. Accordingly, these terms, as utilized to describe the bicycle crank assembly should be interpreted relative to a bicycle equipped with the bicycle crank assembly as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank assembly comprising:
a crank arm having a crank axle mounting part, an extension part extending from the crank axle mounting part, a pedal attachment part provided on a radial outer end of the extension part and a sprocket attachment part; and
an axial gap adjustment device including
an adjustment adapter having a crank arm engagement structure that non-rotatably engages the crank arm, a first crank axle opening, and a first screw part, and
an adjustment member having a second crank axle opening, and a second screw part threadedly engaged with the first screw part to selectively position the adjustment member relative to the adjustment adapter,
the crank arm and he adjustment adapter being separate, non-integral structures.

2. The bicycle crank assembly as set forth in claim 1, wherein
the first screw part is a male screw part, and the second screw part is a female screw part.

3. The bicycle crank assembly as set forth in claim I., wherein
the crank arm is constructed of a material that is different from the adjustment adapter and the adjustment member.

4. The bicycle crank assembly as set forth in claim 1, wherein
the crank axle mounting part has a crank axle receiving hole that is configured to non-rotatably engage a crank axle, 5. The bicycle crank assembly as set forth in claim 1, wherein the crank arm and the adjustment adapter are separably and reinstallably connected together by a mating connection.

6. The bicycle crank assembly as set forth in claim 1, wherein
the crank arm includes at least one recess, and the crank arm engagement structure includes at least one protrusion mating with the at least one recess of the crank arm to form a. non-rotatable connection while the axial gap adjustment device is mounted on the crank arm.

7. The bicycle crank assembly as set forth in claim 1, wherein
the crank arm includes at least one threaded hole, and the adjustment adapter includes a mounting hole, with a screw extending through the mounting hole and threadedly engaging the crank arm.

8. The bicycle crank assembly as set forth in claim 7, wherein
the crank arm includes at least one recess, and the crank arm engagement structure includes at least one protrusion mating with the at least one recess of the crank arm to form a non-rotatable connection while the axial gap adjustment device is mounted on the crank arm.

9. The bicycle crank assembly as set forth in claim 8, wherein the at least one protrusion includes the mounting hole.

10. The bicycle crank assembly as set forth in claim 1, wherein the crank arm includes a plurality of recesses, and the crank arm engagement structure includes a plurality of protrusions mating with the recesses of the crank arm to form a non-rotatable connection while the axial gap adjustment device is mounted on the crank arm.

11. A bicycle crank assembly comprising:
a crank arm having a crank axle mounting part, an extension part extending from the crank axle mounting part, a pedal attachment part provided on a radial outer end of the extension part and a sprocket attachment part, and
an axial gap adjustment device including
an adjustment adapter having a crank arm engagement structure that non-rotatably engages the crank arm, a first crank axle opening, and a first screw part, and
an adjustment member having a second crank axle opening, and a second screw part threadedly engaged with the first screw part to selectively position the adjustment member relative to the adjustment adapter,
the axial gap adjustment device further including a locking pin selectively coupled between the adjustment adapter and the adjustment member to lock relative axial movement between the adjustment adapter and the adjustment member via the first and second screw parts, 12. The bicycle crank assembly as set forth in claim 11, wherein
one of the adjustment adapter and the adjustment member includes a plurality of first locking holes arranged about a corresponding one of the first and second crank axle openings, and the other of the adjustment adapter and the adjustment member includes at least one second locking hole with the locking pin being engaged with one of the first locking holes and the at least one second locking hole while the locking pin is in a locking position.

13. The bicycle crank assembly as set forth in claim 12, wherein
the locking pin has a tool engagement part at one end that is visible and accessible as viewed along the center longitudinal axis of the locking pin from an outer side of the crank arm that faces away from the axial gap adjustment device.

14. The bicycle crank assembly as set forth in claim 11, wherein
the locking pin has a center longitudinal axis that is parallel to a center longitudinal axis of the first and second crank axle openings.

15. A bicycle crank assembly comprising:
a crank arm having a crank axle mounting part, an extension part extending from the crank axle mounting part, a pedal attachment part provided on a radial outer end of the extension part and a sprocket attachment part; and
an axial gap adjustment device including
an adjustment adapter having a crank arm engagement structure that non-rotatably engages the crank arm, a first crank axle opening, and a first screw part, and
an adjustment member having a second crank axle opening, and a second screw part threadedly engaged with the first screw part to selectively position the adjustment member relative to the adjustment adapter,
the sprocket attachment part of the crank arm including a plurality of attachment members extending outward from the crank axle mounting part to free ends, with at least one of the adjustment adapter and the adjustment member being dimensioned so as to be visible and accessible between the attachment members as viewed along center longitudinal axes of the first and second crank axle openings from an outer side of the crank arm that faces away from the axial gap adjustment device.

16. A bicycle crank assembly comprising:
a crank arm having a crank axle mounting part, an extension part extending from the crank axle mounting part, a pedal attachment part provided on a radial outer end of the extension part and a sprocket attachment part; and
an axial gap adjustment device including
an adjustment adapter having a crank arm engagement structure that non-rotatably engages the crank arm, a first crank axle opening and a first screw part, and
an adjustment member having a second crank axle opening, and a second screw part threadedly engaged with the first screw part to selectively position the adjustment member relative to the adjustment adapter,
the adjustment member having a rotation operation part formed on the outer circumferential surface of a tube-shaped fixing part with the rotation operation part being configured and arranged to assist in rotating the adjustment member.

\* \* \* \* \*